(12) United States Patent
Oohashi et al.

(10) Patent No.: US 7,284,312 B2
(45) Date of Patent: Oct. 23, 2007

(54) METHOD FOR MANUFACTURING A DYNAMOELECTRIC STATOR

(75) Inventors: Atsushi Oohashi, Tokyo (JP); Masayuki Fujii, Tokyo (JP)

(73) Assignee: Mitsubishi Denki Kabushiki Kaisha, Tokyo (JP)

(*) Notice: Subject to any disclaimer, the term of this patent is extended or adjusted under 35 U.S.C. 154(b) by 0 days.

(21) Appl. No.: 10/547,480

(22) PCT Filed: Apr. 28, 2003

(86) PCT No.: PCT/JP03/05454

§ 371 (c)(1), (2), (4) Date: Aug. 30, 2005

(87) PCT Pub. No.: WO2004/098028

PCT Pub. Date: Nov. 11, 2004

(65) Prior Publication Data

US 2006/0185152 A1    Aug. 24, 2006

(51) Int. Cl.
*H02K 3/38* (2006.01)
*H02K 15/10* (2006.01)
*H02K 15/12* (2006.01)

(52) U.S. Cl. ............... 29/596; 310/45; 427/116; 427/425

(58) Field of Classification Search ............ 29/596, 29/598; 310/45; 427/116, 425, 284, 374.2, 427/318, 374.1
See application file for complete search history.

(56) References Cited

U.S. PATENT DOCUMENTS

| | | | | |
|---|---|---|---|---|
| 2,574,686 A | * | 11/1951 | Brown | ............ 427/116 |
| 3,075,250 A | * | 1/1963 | Strohm et al. | ............ 264/272.2 |
| 4,485,126 A | | 11/1984 | Gaietto et al. | |
| 5,474,799 A | * | 12/1995 | Thigpen et al. | ............ 427/104 |

FOREIGN PATENT DOCUMENTS

| | | |
|---|---|---|
| CN | 1405949 A | 3/2003 |
| EP | 0414975 A1 | 3/1991 |
| JP | 58-39253 A | 3/1983 |
| JP | 60-98852 A | 6/1985 |
| JP | 5-22908 A | 1/1993 |
| JP | 6-14503 A | 1/1994 |
| JP | 7-67301 A | 3/1995 |
| JP | 07067301 A * | 3/1995 |
| JP | 7-213029 A | 8/1995 |
| JP | 8-126268 A | 5/1996 |
| JP | 08126268 A * | 5/1996 |
| JP | 2001-211590 A | 8/2001 |

OTHER PUBLICATIONS

JP 08126268 A, partial translation.*

* cited by examiner

*Primary Examiner*—A. Dexter Tugbang
*Assistant Examiner*—Livius R. Cazan
(74) *Attorney, Agent, or Firm*—Sughrue Mion Pllc.

(57) ABSTRACT

A method for varnish application to a dynamoelectric stator is disclosed. The method includes a varnish treatment process and application by preheating the stator; adjusting a viscosity of the varnish; dripping the varnish onto a coil end of the stator from radially outside the stator while rotating the preheated stator around a central axis; and hardening the varnish dripped onto the coil end by heating the stator. The varnish viscosity is adjusted so that said varnish dripped onto said coil end passes through the coil end from radially outside to radially inside, and the varnish is dripped onto said coil end along a direction which is perpendicular to the central axis of the collective coils.

5 Claims, 8 Drawing Sheets

METHOD FOR MANUFACTURING A DYNAMOELECTRIC STATOR

TECHNICAL FIELD

The present invention relates to a method for manufacturing a dynamoelectric stator mounted to an automotive vehicle such as a passenger car, a truck, an electric train, etc., and particularly to a method for manufacturing a stator in which a coil end of a stator winding is impregnated with a varnish to a high fill factor.

BACKGROUND ART

In conventional varnish treatment methods for stators, such as that described in Japanese Patent Laid-Open No. HEI 07-213029 (Gazette), for example, varnish is dripped onto surfaces of coil ends of a stator winding from radially outside while rotating a stator heated to a predetermined temperature, then low-pressure air is blown onto the coil ends from radially outside before the viscosity of the varnish increases, and then the varnish is hardened in a drying oven. The varnish dripped onto the surfaces of the coil ends penetrates into the coil ends by capillary action through gaps between the coils of the stator winding, but if the drip rate of the varnish is low, the penetration speed of the varnish is reduced, and the varnish does not penetrate the coil ends completely. Thus, after dripping the varnish, the varnish is forcibly made to penetrate inside the coil ends by blowing the low-pressure air onto the coil ends. It is claimed that the varnish can thereby be made to penetrate the coil ends completely, even if the drip rate of the varnish is low.

However, in conventional varnish treatment methods for stators, one disadvantage has been that an air generator is required, making the varnish treatment process an extremely large-scale operation.

DISCLOSURE OF INVENTION

The present applicants have focused their attention on varnish viscosity at the temperature of the preheated stator in the varnish treatment process, and have found that the varnish fill factor can be increased by adjusting the varnish viscosity at the temperature of the stator during varnish application to a predetermined range such that varnish that has penetrated inside the coil ends remains inside the coil ends without dripping out of the coil ends, thereby leading to the invention of the present invention.

An object of the present invention is to provide a method for manufacturing a dynamoelectric stator enabling coil ends to be impregnated with a varnish simply and to a high fill factor by adjusting varnish viscosity at a temperature of a stator during varnish application to a predetermined range.

In order to achieve the above object, according to one aspect of the present invention, there is provided a method for manufacturing a dynamoelectric stator including a varnish treatment process including: a preheating process in which the stator is preheated; a varnish application process in which a varnish adjusted so as to have a viscosity of 16 to 105 mPa·s at a temperature of the stator during varnish application is dripped onto a coil end from radially outside the stator while rotating the preheated stator around a central axis; and a varnish heat hardening process in which the varnish is hardened by heating the stator to which the varnish has been applied.

BEST MODE FOR CARRYING OUT THE INVENTION

Preferred embodiments of the present invention will now be explained with reference to the drawings.

EMBODIMENT 1

Figure 1:
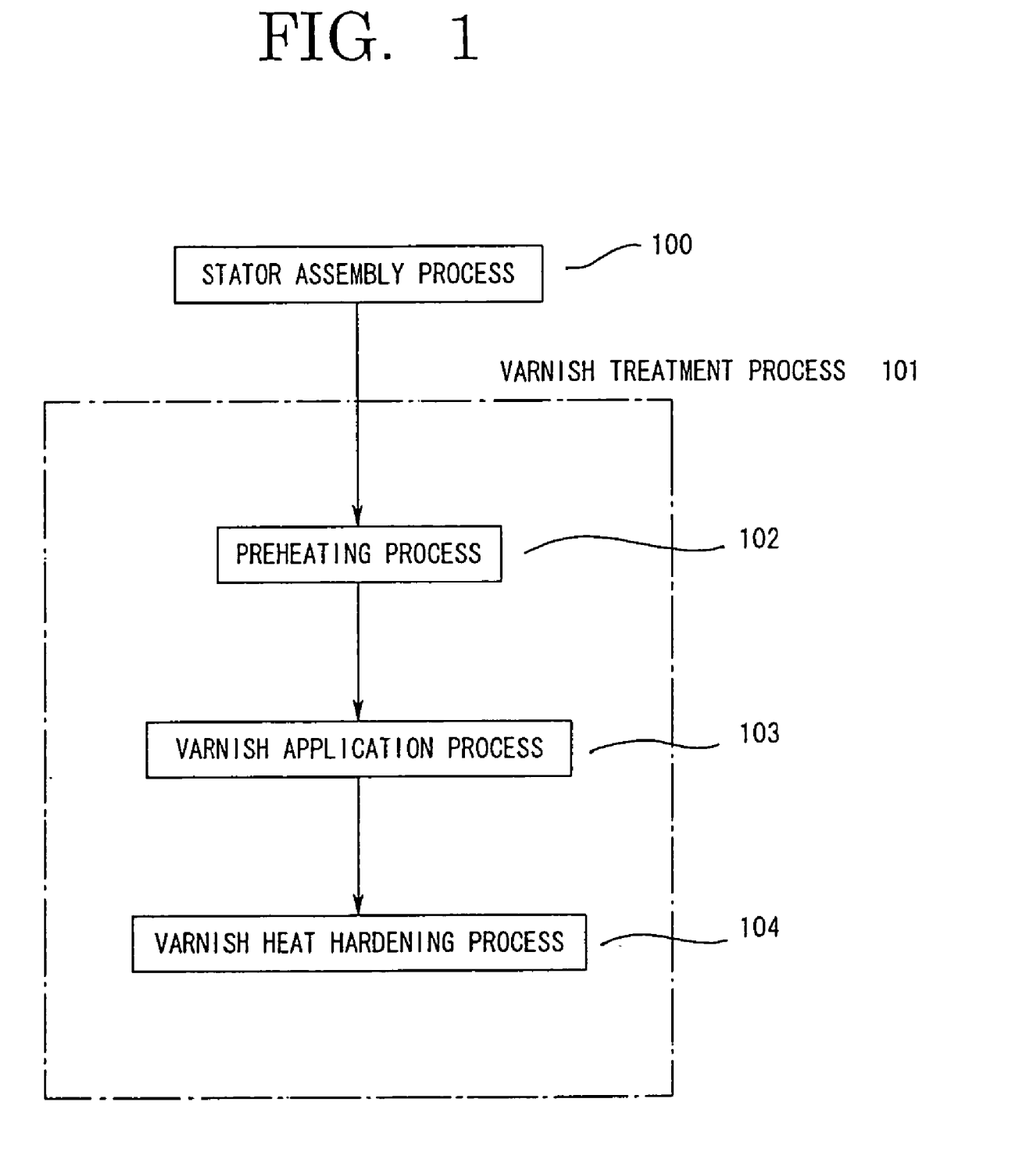
FIG. 1 is a process diagram explaining a method for manufacturing a dynamoelectric stator according to Embodiment 1 of the present invention.
Figure 2:
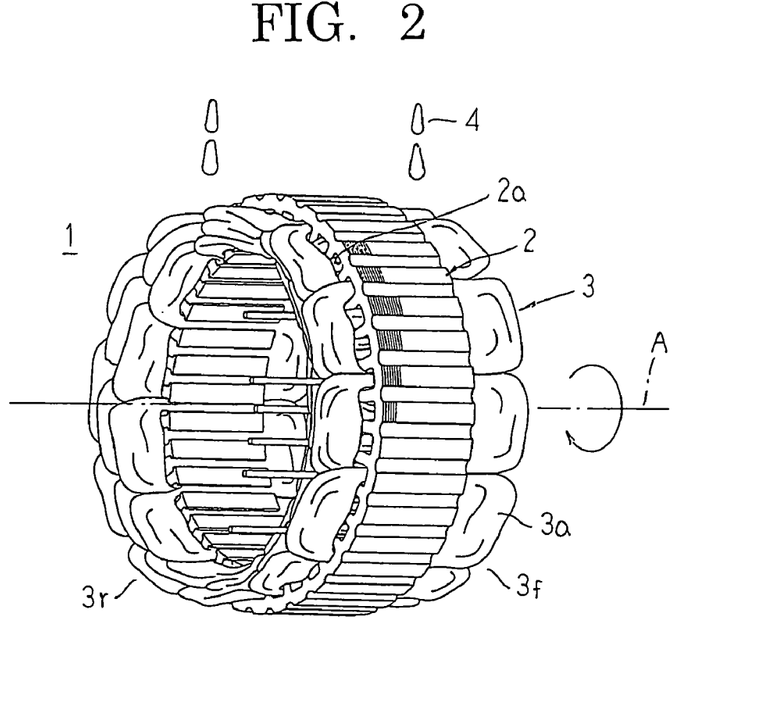
FIG. 2 is a perspective explaining a varnish application process in the method for manufacturing a dynamoelectric stator according to Embodiment 1 of the present invention.
Figure 3:
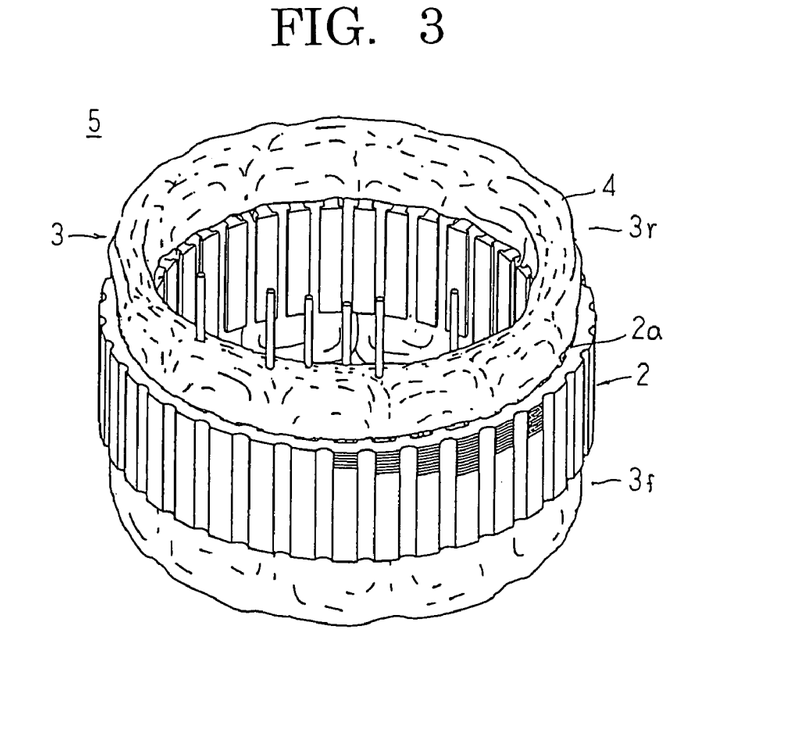
FIG. 3 is a perspective showing a stator manufactured according to the method for manufacturing a dynamoelectric stator according to Embodiment 1 of the present invention.
Figure 4:
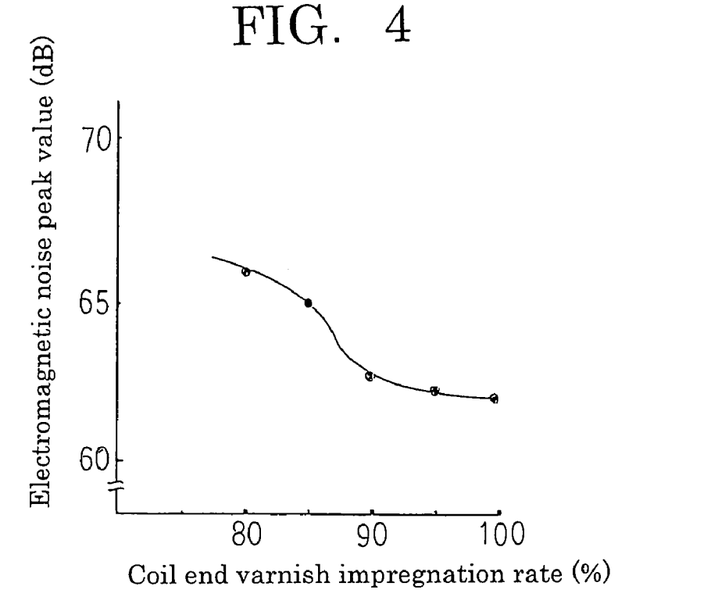
FIG. 4 is a graph showing a relationship between coil end varnish impregnation rate and electromagnetic noise peak value in the method for manufacturing a dynamoelectric stator according to Embodiment 1 of the present invention.

FIG. 1 is a process diagram explaining a method for manufacturing a dynamoelectric stator according to Embodiment 1 of the present invention, FIG. 2 is a perspective explaining a varnish application process in the method for manufacturing a dynamoelectric stator according to Embodiment 1 of the present invention, FIG. 3 is a perspective showing a stator manufactured according to the method for manufacturing a dynamoelectric stator according to Embodiment 1 of the present invention, and FIG. 4 is a graph showing a relationship between coil end varnish impregnation rate and electromagnetic noise peak value in the method for manufacturing a dynamoelectric stator according to Embodiment 1 of the present invention.

First, a stator assembly process 100 will be explained.

In the stator assembly process 100, a cylindrical stator core 2 is first produced by laminating magnetic steel sheets. In the stator core 2, thirty-six slots 2a having grooves lying in an axial direction are arranged at a predetermined pitch in a circumferential direction so as to open radially inward. Then, an annular winding unit (not shown) is produced by winding a conductor wire constituted by a thin copper wire coated with an electrical insulator for a predetermined number of winds, and a star-shaped winding unit 3a is produced by shaping the annular winding unit into a star shape. Next, a stator assembly 1 such as that shown in FIG. 2 is obtained by mounting a plurality of the star-shaped winding units 3a to the stator core 2.

Moreover, a stator winding 3 is constituted by the plurality of star-shaped winding units 3a mounted to the stator core 2. The conductor wires are installed as wave windings in every third slot 2a so as to project outward from a slot 2a at a first axial end of the stator core 2, be turned around at the first axial end of the stator core 2 and enter the next slot 2a three slots away, and then project outward at a second axial end of the stator core 2, be turned around at the second axial end of the stator core 2 and enter the next slot 2a a further three slots away. At each of the axial ends of the stator core 2, portions of the conductor wires turned around between the slots 2a three slots apart constitute coil ends 3f and 3r.

Next, a varnish treatment process 101 will be explained.

The stator assembly 1 assembled in this manner is placed inside a drying oven (not shown), and is preheated to a predetermined temperature (preheating process 102).

Then, the stator assembly 1 heated to the predetermined temperature is removed from the drying oven, and as shown in FIG. 2, a varnish 4 dispensed by a varnish feeding apparatus (not shown) is dripped onto the coil ends 3f and 3r from radially outside while rotating the stator assembly 1 around a central axis A (varnish application process 103).

Next, the stator assembly 1 to which a predetermined amount of varnish 4 has been applied is placed inside the drying oven, the temperature inside the drying oven is raised to a heat hardening temperature of the varnish 4, and then maintained at the varnish hardening temperature for a predetermined amount of time to harden the varnish 4 (varnish heat hardening process 104). Then, the stator assembly 1 is cooled to room temperature, and is then removed from the drying oven to obtain a stator 5 such as that shown in FIG. 3.

Moreover, in the varnish heat hardening process 104, the stator assembly 1 is rotated around the central axis until the varnish 4 gels, in other words, for several minutes while the temperature inside the drying oven is increasing, and then rotation of the stator assembly 1 around the central axis is stopped.

Here, a THEIC-denatured polyester containing an unsaturated polyester resin as a major constituent and to which THEIC (a heat resistance improver), HOMA (a reactive diluent), etc., have been added is used in the varnish 4. The amount of HOMA added to the varnish 4 is adjusted such that a viscosity of 9,000 mPa·s at room temperature becomes a viscosity of 22 mPa·s at 100 degrees Celsius. Moreover, THEIC is trihydroxyethyl isocyanurate, and HOMA is 2-hydroxyethyl methacrylate. Furthermore, in the preheating process 102, the stator assembly 1 is preheated to 150 degrees Celsius. In the varnish application process 103, varnish application is commenced promptly on the stator assembly 1 removed from the drying oven, and the application of the varnish 4 is completed before the temperature of the stator assembly 1 drops to approximately 80 degrees Celsius. In this varnish application process 103, the stator assembly 1 is rotated at 36 rpm. Finally, in the varnish heat hardening process 104, the stator assembly 1 is heat hardened at 160 degrees Celsius for thirty minutes.

According to Embodiment 1, because the varnish 4 is adjusted such that the varnish viscosity at 100 degrees Celsius is 22 mPa·s in the varnish application process 103, the varnish 4 rises to the temperature of the coil ends 3f and 3r when applied to the surfaces of the coil ends 3f and 3r and has a suitable degree of fluidity. Then, because the stator assembly 1 is rotated around the central axis during varnish application, varnish 4 having a suitable degree of fluidity penetrates inside the coil ends 3f and 3r by capillary action of the gaps between the coils constituting the coil ends 3f and 3r without dripping off the coil ends 3f and 3r, and fills the insides of coil ends 3f and 3r. Consequently, the coil ends 3f and 3r can be filled with the varnish 4 to a high fill factor without using an air generator.

While the temperature is increasing in the varnish heat hardening process 104, the viscosity of the varnish 4 charged inside the coil ends 3f and 3r decreases, and its fluidity increases. Here, the stator assembly 1 is initially rotated around the central axis A for several minutes in the varnish heat hardening process 104. Thus, the varnish 4 having increased fluidity remains inside the coil ends 3f and 3r and gels without dripping off the coil ends 3f and 3r. Thus, a jig for preventing dripping of the varnish 4 is no longer necessary, and the formation of bubbles is suppressed, enabling filling to a high density.

In a stator 5 produced in this manner, the coils constituting the coil ends 3f and 3r are covered by the varnish 4. Thus, because the coils constituting the coil ends 3f and 3r are prevented from coming into contact with each other and damaging the electrically-insulating coatings during handling of the stator 5, and in addition the coil ends 3f and 3r are prevented from coming into contact with brackets and damaging the electrically-insulating coatings when the stator 5 is installed in an automotive alternator, electrical insulation properties are improved significantly. In an automotive alternator mounted with the stator 5, galvanic corrosion of the coils resulting from adhesion to the coil ends 3f and 3r of salt water, etc., entering from outside is also prevented. In addition, because the insides of the coil ends 3f and 3r are filled with the varnish 4 to a high fill factor, the overall rigidity of the stator 5 is increased. Thus, when an automotive alternator mounted with the stator 5 is operated, the generation of electromagnetic noise is reduced significantly.

In addition, because the insides of the coil ends 3f and 3r are filled with the varnish 4 to a high fill factor, the occurrence of air pockets in the varnish 4 is suppressed. Thus, heat generated in the coil ends 3f and 3r is transferred to outer peripheral surfaces of the coil ends 3f and 3r by means of the varnish 4 and cooled effectively by cooling airflows. Thus, excessive temperature increases in the coil ends 3f and 3r are suppressed, enabling increased output from the stator 5.

Now, measurements of electromagnetic noise peak value when stators produced with various coil end varnish impregnation rates were installed in an automotive alternator and rotational frequency was increased to 3,000 rpm are shown in FIG. 4. Moreover, the coil end varnish impregnation rate is the percentage of varnish and conductor wires compared with the cross-sectional area of the coil ends. In other words, the impregnation rate decreases when bubbles are formed.

From FIG. 4, it can be seen that the electromagnetic noise peak value depends on the varnish impregnation rate. In other words, when the varnish impregnation rate is high, the rigidity of the stator itself is increased, suppressing the generation of electromagnetic noise. When the varnish impregnation rate exceeds ninety percent, the electromagnetic noise peak value stabilizes at less than or equal to 63 dB, making it desirable for the varnish impregnation rate to be greater than or equal to ninety percent.

In a region in which the varnish viscosity at the stator assembly temperature during varnish application is less than 16 mPa·s, the fluidity is too high, and varnish 4 applied to the surfaces of the coil ends 3f and 3r penetrates inside the coil ends 3f and 3r easily, but penetrates inside the slots 2a or drips off the coil ends 3f and 3r without remaining inside the coil ends 3f and 3r. As a result, a stator in which the fill factor of the varnish 4 is greater than or equal to ninety percent could not be achieved. On the other hand, in a region in which the varnish viscosity at the stator assembly temperature during varnish application exceeds 105 mPa·s, the fluidity is too low, and varnish 4 applied to the surfaces of the coil ends 3f and 3r has trouble penetrating inside the coil ends 3f and 3r, and the coil ends 3f and 3r are not filled sufficiently. As a result, a stator in which the fill factor of the varnish 4 is greater than or equal to ninety percent could not be achieved. Consequently, it is desirable for the varnish viscosity at the stator assembly temperature during varnish application to be adjusted to within a range from 16 mPa·s to 105 mPa·s.

Next, rotational speed of the stator assembly 1 in the varnish application process 103 will be investigated.

It is desirable for the rotational speed of the stator assembly 1 to be increased if a varnish having a low viscosity is used, and for the rotational speed of the stator assembly 1 to be reduced if a varnish having a high viscosity is used. Thus, when a varnish adjusted to a viscosity of 16 mPa·s is applied, if the rotational speed of the stator assembly 1 exceeds approximately 50 rpm, varnish applied to the surfaces of the coil ends 3f and 3r starts to be splattered radially outward, and the amount of splattering of the varnish increases as the rotational speed increases. As a result, the desired varnish impregnation rate can no longer be ensured. When a varnish adjusted to a viscosity of 105 mPa·s is applied, if the rotational speed of the stator assembly 1 is less than 5 rpm, dripping of the varnish applied to the surfaces of the coil ends 3f and 3r occurs. As a result, the desired varnish impregnation rate can no longer be ensured. Consequently, it is desirable for the rotational speed of the stator assembly 1 in the varnish application process to be set within a range from 5 to 50 rpm.

Moreover, in Embodiment 1 above, a THEIC-denatured polyester containing an unsaturated polyester resin as a major constituent and to which THEIC, HOMA, etc., have been added is used for the varnish 4, but similar effects can also be achieved by using as a varnish an epoxy imide-denatured polyester containing an unsaturated polyester resin and an epoxy resin as major constituents and to which styrene monomer (a reactive diluent), BDMA (benzil dimethylamine), etc., have been added.

In Embodiment 1 above, the stator assembly 1 is initially rotated for several minutes in the varnish heat hardening process, but rotation of the stator assembly 1 is not limited to a particular length of time provided that the varnish 4 gels and generally loses its fluidity. In addition, the stator assembly 1 may also be rotated throughout the varnish heat hardening process.

EMBODIMENT 2

Figure 5:
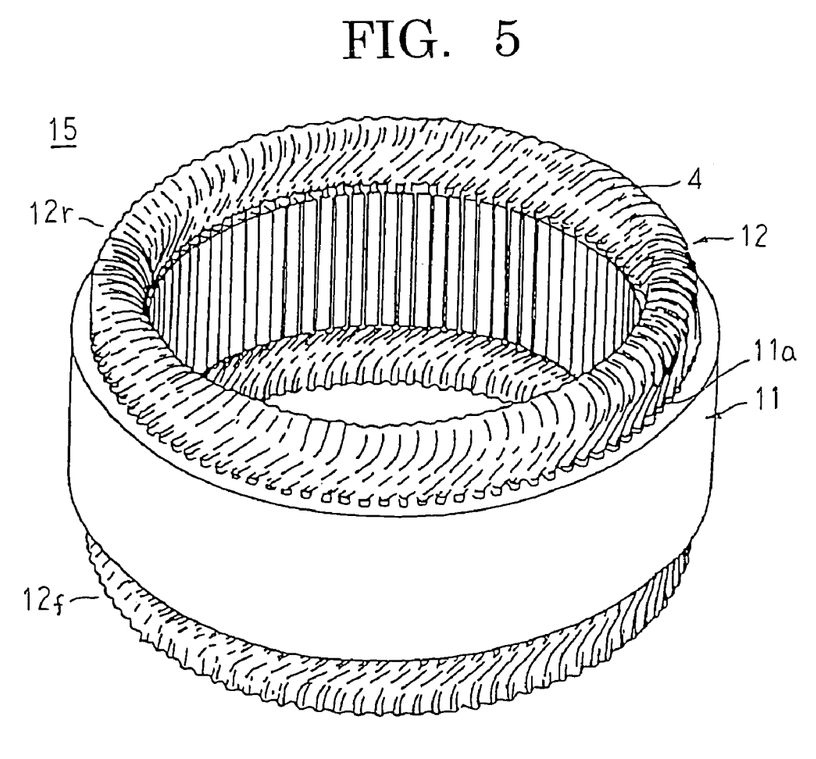
FIG. 5 is a perspective showing a stator manufactured according to a method for manufacturing a dynamoelectric stator according to Embodiment 2 of the present invention.
Figure 6:
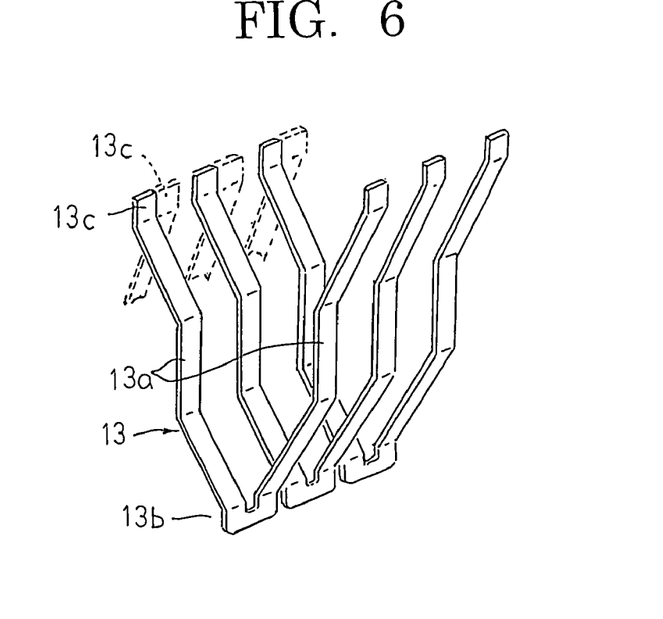
FIG. 6 is a perspective explaining a stator winding construction of a stator assembly in the method for manufacturing a dynamoelectric stator according to Embodiment 2 of the present invention.
Figure 7:
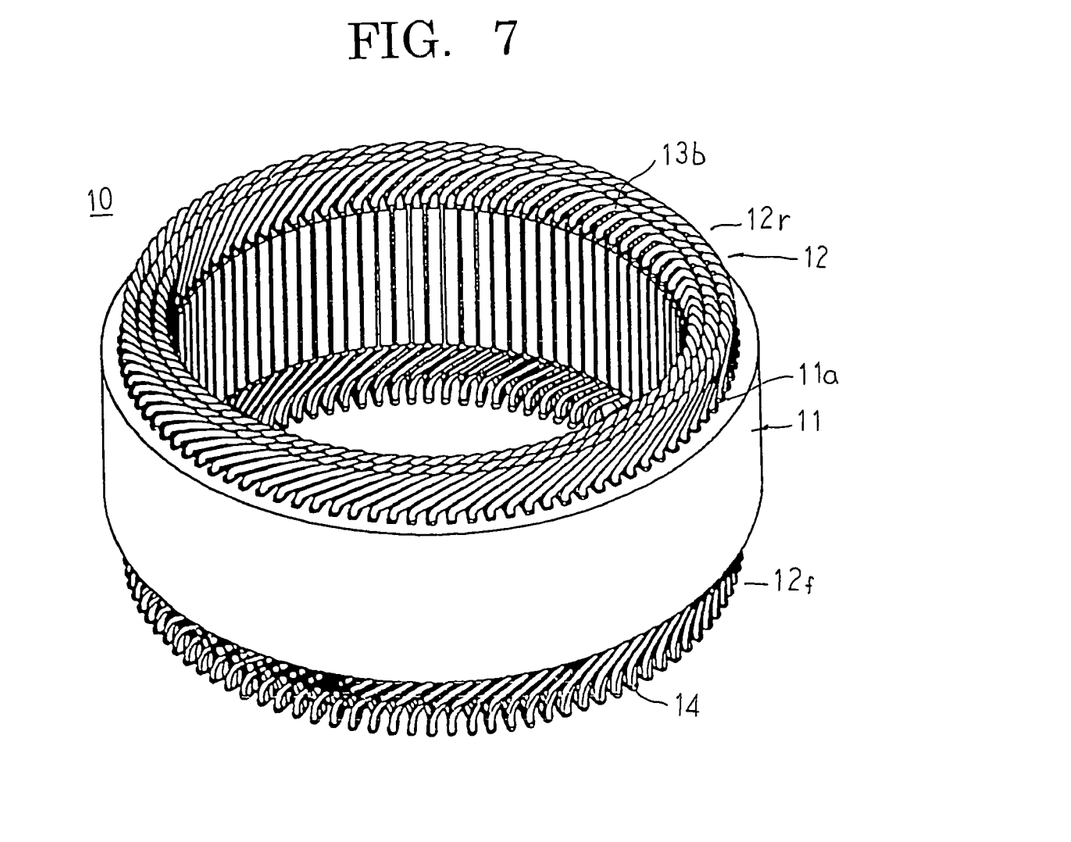
FIG. 7 is a perspective showing the stator assembly in the method for manufacturing a dynamoelectric stator according to Embodiment 2 of the present invention.

FIG. 5 is a perspective showing a stator manufactured according to a method for manufacturing a dynamoelectric stator according to Embodiment 2 of the present invention, FIG. 6 is a perspective explaining a stator winding of a stator assembly in the method for manufacturing a dynamoelectric stator according to Embodiment 2 of the present invention, and FIG. 7 is a perspective showing the stator assembly in the method for manufacturing a dynamoelectric stator according to Embodiment 2 of the present invention.

In Embodiment 2, a stator winding 12 is produced using conductor segments 13 constituted by short lengths of copper material coated with an electrical insulator. These conductor segments 13, as shown in FIG. 6, are shaped into a U shape in which a pair of slot-housed portions 13a are linked by a U-shaped return portion 13b. A stator core 11 is produced by laminating magnetic steel sheets into a cylindrical shape. In the stator core 11, as shown in FIG. 7, ninety-six slots 11a having grooves lying in an axial direction are arranged at a predetermined pitch in a circumferential direction so as to open radially inward. Moreover, to facilitate explanation, housing positions of the slot-housed portions 13a inside the slots 11a will be designated Address 1, Address 2, etc., through Address 6, respectively, from a shallowest position (an innermost peripheral position) in a slot depth direction.

First, in a stator assembly process, three conductor segments 13 are inserted from a first axial end of the stator core 11 into each of pairs of slots 11a six slots apart. Then, open end portions 13c of the conductor segments 13 projecting out through a second axial end of the stator core 11 are stacked on top of one another, joined together, and integrated by welding to obtain a stator assembly 10 such as that shown in FIG. 7. Moreover, weld portions between the open end portions 13c of the conductor segments 13 constitute joint portions 14.

Here, six slot-housed portions 13a are arranged in a single column in a slot depth direction in each of the slots 11a. At the first axial end of the stator core 11, slot-housed portions 13a in Address 1, Address 3, and Address 5 inside a first slot 11a of a slot pair and slot-housed portions 13a in Address 2, Address 4, and Address 6 inside a second slot 11a are each linked by a return portion 13b. Thus, at the first axial end of the stator core 11, the return portions 13b are arranged at a pitch of one slot in a circumferential direction so as to form three rows constituting coil ends 12r. On the other hand, at the second axial end of the stator core 11, slot-housed portions 13a in Address 2, Address 4, and Address 6 inside a first slot 11a of a slot pair and slot-housed portions 13a in Address 1, Address 3, and Address 5 inside a second slot 11a are each linked by a joint portion 14. Thus, at the second axial end of the stator core 11, the joint portions 14 are arranged at a pitch of one slot in a circumferential direction so as to form three rows constituting coil ends 12f. Furthermore, the stator winding 12 is constituted by a plurality of wave windings configured such that slot-housed portions 13a inserted into every sixth slot 11a are alternately linked by a return portion 13b and a joint portion 14.

Next, in the varnish treatment process, the stator assembly 10 is first preheated to 150 degrees Celsius inside a drying oven in a similar manner to Embodiment 1 above. Then, the stator assembly 10 heated to 150 degrees Celsius is removed from the drying oven, and a varnish 4 adjusted so as to have a viscosity of 22 mPa·s at 100 degrees Celsius is applied by dripping onto the coil ends 12f and 12r from radially outside while rotating the stator assembly 10 around a central axis at 36 rpm. Next, the stator assembly 10 to which the varnish 4 has been applied is placed inside a drying oven and is heated to 160 degrees Celsius. At this time, the stator assembly 10 is initially rotated around the central axis at 36 rpm for several minutes. Then, the stator assembly 10 is maintained at 160 degrees Celsius for thirty minutes to harden the varnish 4 and obtain a stator 15 such as that shown in FIG. 5.

In Embodiment 2, because the varnish viscosity at 100 degrees Celsius is adjusted so as to be 22 mPa·s and the stator assembly 10 is rotated around the central axis in the varnish application process, a stator 15 can also be manufactured in which the coil ends 12f and 12r are filled with the varnish 4 to a high fill factor in a similar manner to Embodiment 1 above.

Now, in this stator assembly 10, the copper material of the joint portions 14 arranged at a pitch of one slot in a circumferential direction so as to form three rows is exposed by welding, but by performing this varnish treatment process, these joint portions 14 are reliably covered by the varnish 4, improving electrical insulation properties and galvanic corrosion resistance.

Because the stator winding 12 is constituted by U-shaped conductor segments 13, the return portions 13b and the joint portions 14 of the coil ends 12f and 12r are configured so as to align in rows in a circumferential direction. Thus, the varnish 4 penetrates inside the coil ends 12f and 12r smoothly through gaps between the return portions 13b or gaps between the joint portions 14, reducing the formation of air pockets. Thus, heat generated in the return portions 13b and the joint portions 14 is transferred to outer peripheral surfaces of the coil ends 12f and 12r by means of the varnish 4 and cooled effectively by cooling airflows. Thus, excessive temperature increases in the coil ends 12f and 12r are suppressed, enabling increased output from the stator 15.

EMBODIMENT 3

Figure 8:
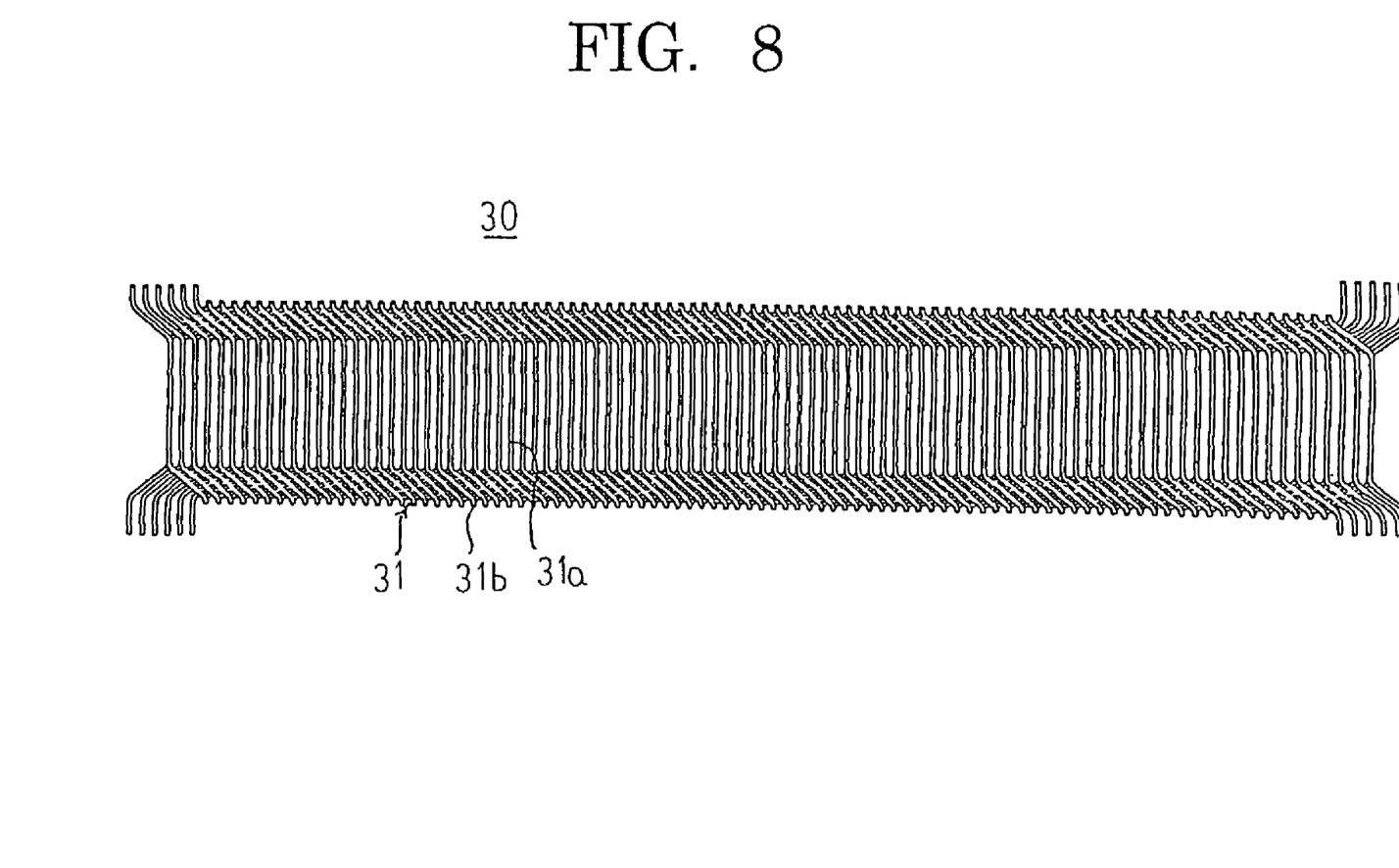
FIG. 8 is a plan showing a winding assembly in a method for manufacturing a dynamoelectric stator according to Embodiment 3 of the present invention.
Figure 9:
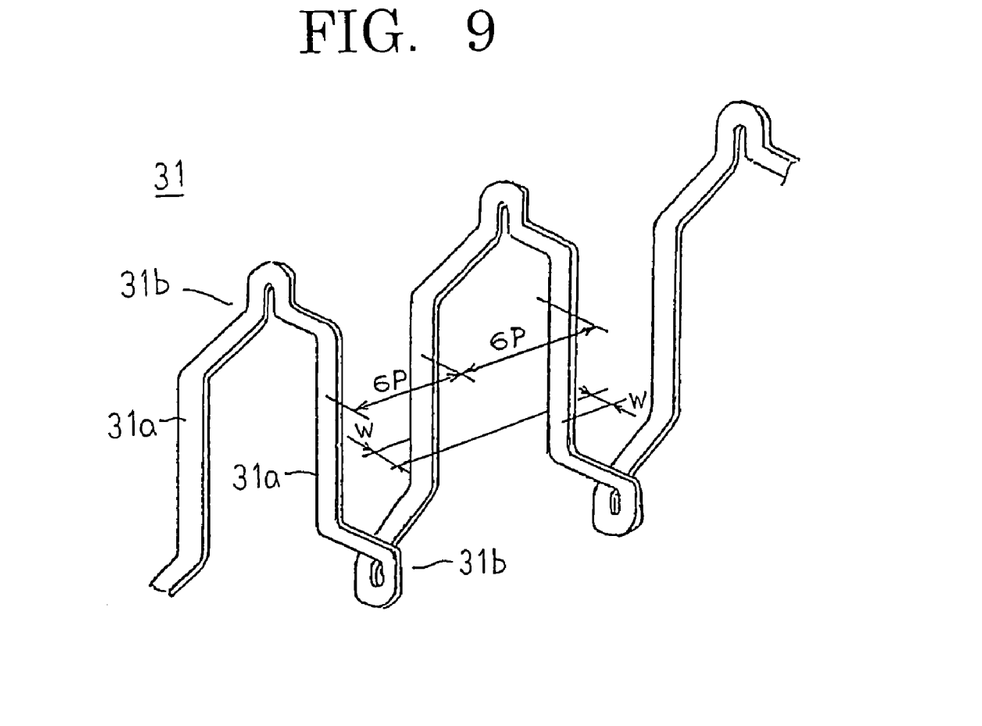
FIG. 9 is a perspective showing part of a continuous conductor wire constituting the winding assembly shown in FIG. 8.
Figure 10:
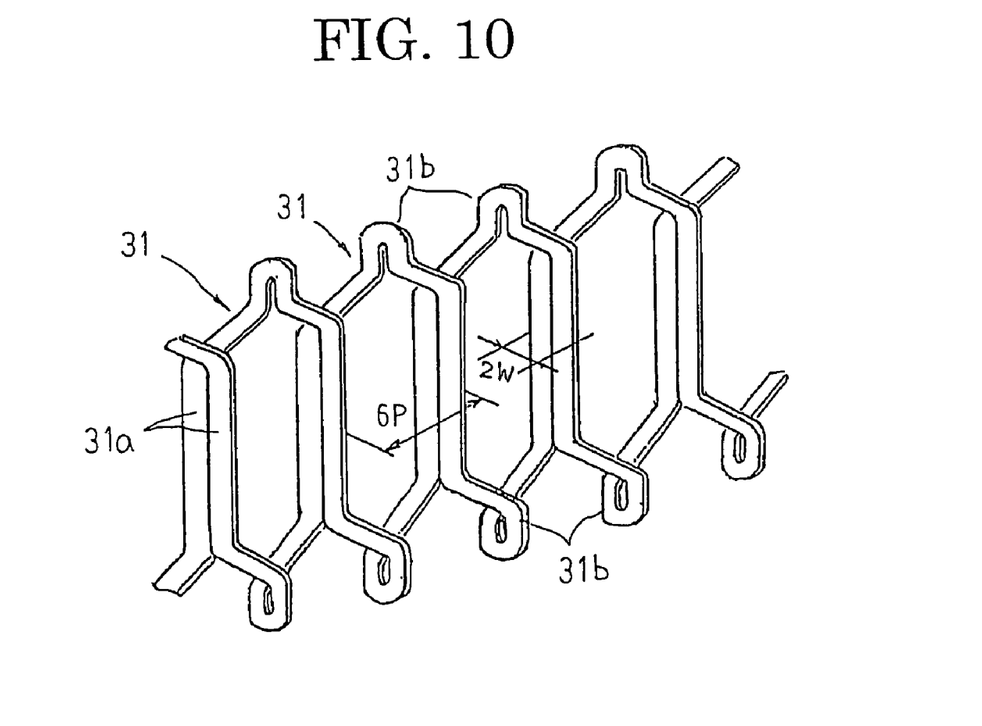
FIG. 10 is a diagram explaining an arranged state of continuous conductor wires constituting the winding assembly shown in FIG. 8.
Figure 11:
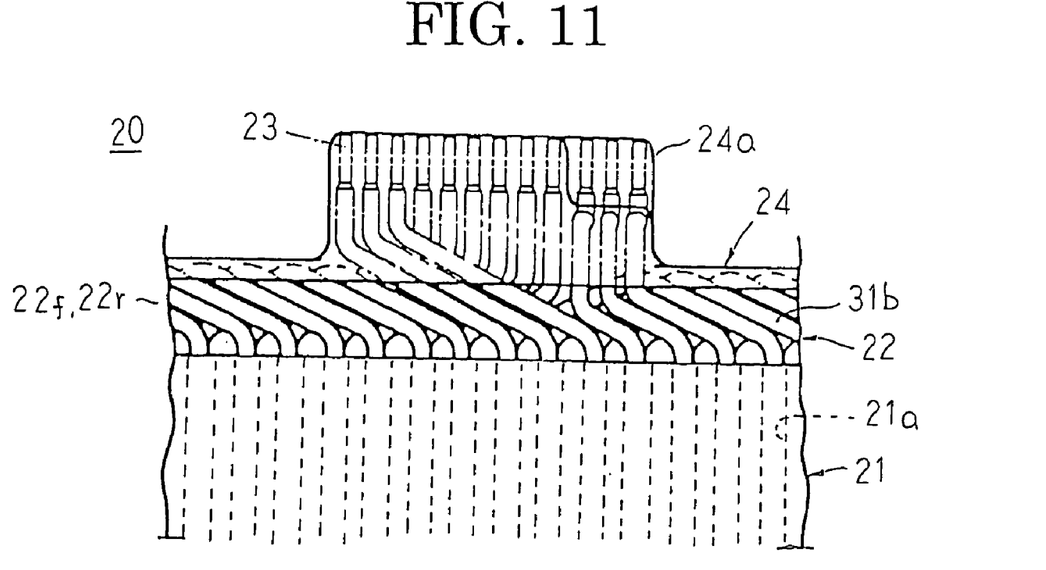
FIG. 11 is a plan of part of a stator assembly mounted with a partitioning plate in the method for manufacturing a dynamoelectric stator according to Embodiment 3 of the present invention viewed from radially outside.
Figure 12:
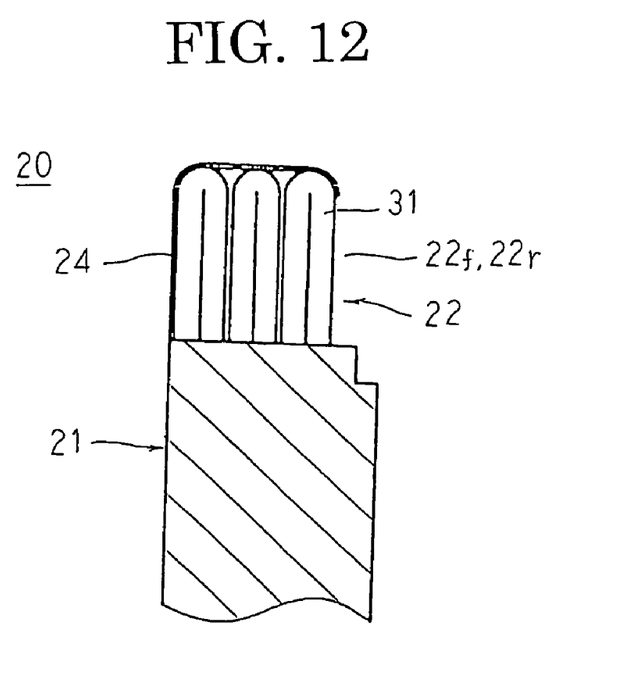
FIG. 12 is a cross section showing part of the stator assembly mounted with the partitioning plate in the method for manufacturing a dynamoelectric stator according to Embodiment 3 of the present invention.
Figure 13:
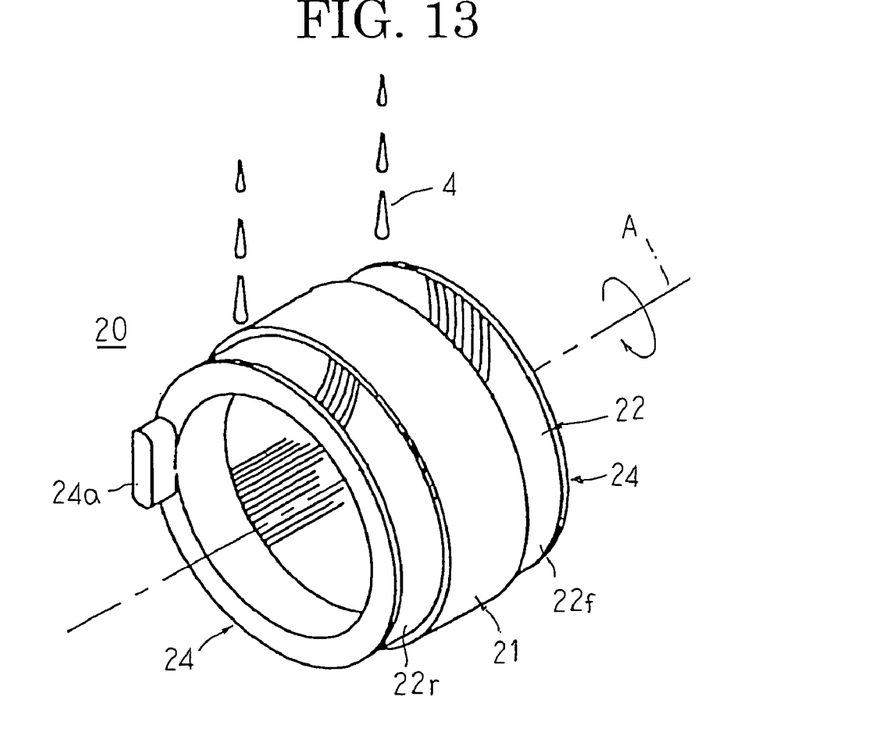
FIG. 13 is a perspective explaining a varnish application process in the method for manufacturing a dynamoelectric stator according to Embodiment 3 of the present invention.
Figure 14:
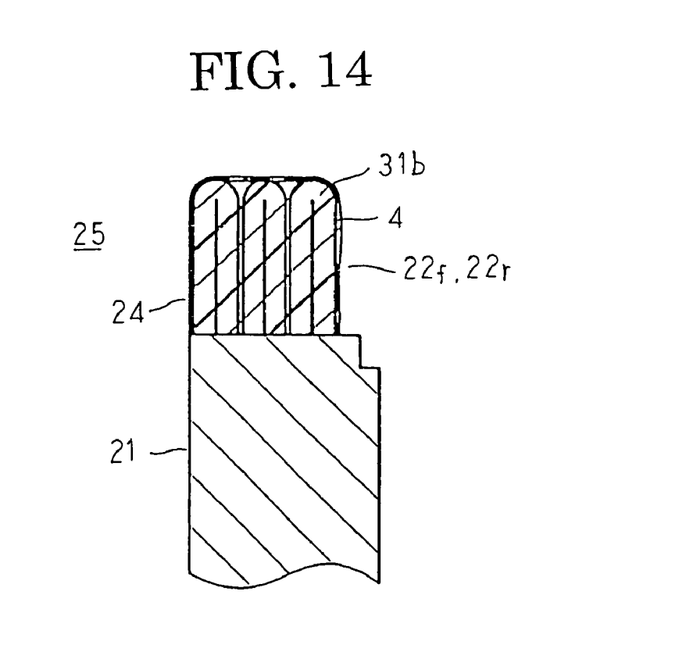
FIG. 14 is a cross section showing part of a stator manufactured according to the method for manufacturing a dynamoelectric stator according to Embodiment 3 of the present invention.

FIG. 8 is a plan showing a winding assembly a method for manufacturing a dynamoelectric stator according to Embodiment 3 of the present invention, FIG. 9 is a perspective showing part of a continuous conductor wire constituting the winding assembly shown in FIG. 8, FIG. 10 is a diagram explaining an arranged state of continuous conductor wires constituting the winding assembly shown in FIG. 8, FIG. 11 is a plan of part of a stator assembly mounted with a partitioning plate in the method for manufacturing a dynamoelectric stator according to Embodiment 3 of the present invention viewed from radially outside, FIG. 12 is a cross section showing part of the stator assembly mounted with the partitioning plate in the method for manufacturing a dynamoelectric stator according to Embodiment 3 of the present invention, FIG. 13 is a perspective explaining a varnish application process in the method for manufacturing a dynamoelectric stator according to Embodiment 3 of the present invention, and FIG. 14 is a cross section showing part of a stator manufactured according to the method for manufacturing a dynamoelectric stator according to Embodiment 3 of the present invention.

In Embodiment 3, a stator winding 22 is configured using winding assemblies 30 such as that shown in FIG. 8. These winding assemblies 30 are each produced by arranging twelve continuous conductor wires 31 constituted by copper wires coated with an electrical insulator at a pitch of one slot in a common plane and folding them up simultaneously. As shown in FIG. 9, each of the continuous conductor wires 31 is shaped by bending into a planar pattern in which straight portions 31a linked by return portions 31b are arranged at a pitch of six slots (6P). Adjacent straight portions 31a are offset by the return portions 31b by a width (w) of the continuous conductor wires 31. Six conductor wire pairs in each of which two continuous conductor wires 31 shaped in such a pattern are arranged so as to be offset by a pitch of six slots with straight portions 31a superposed (as shown in FIG. 10) are arranged so as to be offset by a pitch of one slot from each other to constitute each of the winding assemblies 30. Six end portions of the continuous conductor wires 31 extend outward on two sides at two ends of the winding assemblies 30. The return portions 31b are arranged so as to be aligned in rows on two side portions of the winding assemblies 30.

First, in a stator assembly process, three winding assemblies 30 are mounted so as to be stacked in a rectangular parallelepiped core (not shown), then the rectangular parallelepiped core is rolled up, and two end surfaces of the rolled-up core are abutted and integrated by welding. Two end portions of this rolled-up core are integrated by welding to obtain a stator core 21 configured in a similar manner to that of the stator core 11 according to Embodiment 2 above. Then, end portions of the continuous conductor wires 31 projecting outward on the two sides at the two ends of the winding assemblies 30 are joined together to obtain a stator assembly 20, in which the stator winding 22 is installed in the stator core 21.

Here, six straight portions 31a are arranged in a single column in a slot depth direction in each of the slots 21a. At the first axial end of the stator core 21, straight portions 31a in Address 1, Address 3, and Address 5 inside a first slot 21a of a slot pair and straight portions 31a in Address 2, Address 4, and Address 6 inside a second slot 21a are each linked by a return portion 31b. Thus, at the first axial end of the stator core, the return portions 31b are arranged at a pitch of one slot in a circumferential direction so as to form three rows constituting coil ends 22r. Similarly, at the second axial end of the stator core 21, straight portions 31a in Address 2, Address 4, and Address 6 inside a first slot 21a of a slot pair and straight portions 31a in Address 1, Address 3, and Address 5 inside a second slot 21a are each linked by a return portion 31b. Thus, at the second axial end of the stator core 21, the return portions 31b are arranged at a pitch of one slot in a circumferential direction so as to form three rows constituting coil ends 22f. Joint portions 23 among end portions of the continuous conductor wires 31 extend outward onto the coil ends 22f and 22r.

Next, as shown in FIGS. 11 and 12, partitioning plates 24 are mounted to the coil ends 22f and 22r of the stator assembly 20. These partitioning plates 24 are made of an electrically-insulating resin, and are shaped into annular bodies having a J-shaped cross section covering inner peripheral wall surfaces and top portions of the coil ends 22f and 22r. The joint portions 23 are housed inside cap portions 24a formed on the partitioning plates 24.

Next, in the varnish treatment process, the stator assembly 20 is preheated to 150 degrees Celsius inside a drying oven in a similar manner to Embodiment 1 above. Then, the preheated stator assembly 20 is removed from the drying oven, and a varnish 4 adjusted so as to have a viscosity of 22 mPa·s at 100 degrees Celsius is applied by dripping onto the coil ends 22f and 22r from radially outside while rotating the stator assembly 20 around a central axis A at 36 rpm as shown in FIG. 13. Finally, the stator assembly 20 to which the varnish 4 has been applied is placed inside a drying oven and is heated to 160 degrees Celsius. At this time, the stator assembly 20 is initially rotated around the central axis A at 36 rpm for several minutes. Then, rotation of the stator assembly 20 is stopped and the stator assembly 20 is heated at 160 degrees Celsius for thirty minutes to harden the varnish 4 and obtain a stator 25. In this stator 25, as shown in FIG. 14, insides of the coil ends 22f and 22r are sufficiently impregnated with the varnish 4.

In Embodiment 3, because the varnish viscosity at 100 degrees Celsius is adjusted so as to be 22 mPa·s, a stator 25 can also be manufactured in which the coil ends 22f and 22r are filled with the varnish 4 to a high fill factor in a similar manner to Embodiment 1 above.

Now, in this stator assembly 20, the copper material of the joint portions 23 is exposed by welding, but by applying this varnish treatment process, these joint portions 23 are reliably covered by the varnish 4, improving electrical insulation properties and galvanic corrosion resistance.

In addition, according to Embodiment 3, because the partitioning plates 24 are mounted to the stator assembly 20 before the varnish treatment process, the varnish 4 is reliably prevented from dripping in the varnish application process. Thus, because there is no radially-inward extrusion of varnish 4, the varnish 4 will not interfere with the rotor and the fans when the stator 25 is mounted to an automotive alternator. Because radially-inner peripheral surfaces and axially-outer peripheral surfaces of the coil ends 22f and 22r are constituted by smooth surfaces of the partitioning plates 24, wind noise generated by cooling airflows from the fans colliding with the inner wall surfaces of the coil ends 22f and 22r is reduced when the stator 25 is mounted to an automotive alternator.

Because the stator winding 22 is constituted by winding assemblies 30, the return portions 31b of the coil ends 22f and 22r are configured so as to align in rows in a circumferential direction. Thus, the varnish 4 penetrates inside the coil ends 22f and 22r smoothly through gaps between the return portions 31b, reducing the formation of air pockets. Thus, heat generated in the return portions 31b is transferred to outer peripheral surfaces of the coil ends 22f and 22r by means of the varnish 4 and cooled effectively by cooling airflows. Thus, excessive temperature increases in the coil ends 22f and 22r are suppressed, enabling increased output from the stator 25.

Moreover, the partitioning plates 24 should have electrically-insulating properties and heat tolerance and, for example, glass-reinforced epoxy resin, nylon, etc., can be used.

INDUSTRIAL APPLICABILITY

As explained above, because coil ends are impregnated with varnish to a high fill factor, electrical insulation properties and galvanic corrosion resistance of the stator winding are improved, and the overall rigidity of the stator is also increased, making the method for manufacturing a dynamoelectric stator according to the present invention useful as a method for manufacturing a dynamoelectric stator having a harsh service environment such as an automotive alternator mounted to an automotive vehicle, etc., such as an automobile, etc.

The invention claimed is:

1. A method for manufacturing a dynamoelectric stator, said stator comprising:
   a cylindrical stator core in which slots are arranged in a circumferential direction so as to open onto a radially-inner side; and
   a stator winding mounted to said stator core,
   a coil end of said stator winding being impregnated with a varnish,
   wherein said method for manufacturing a dynamoelectric stator comprises:
   a varnish treatment process comprising:
      preheating said stator;
      adjusting said varnish so as to have a viscosity of 16 to 105 mPa·s at a temperature of said stator during varnish application;
      dripping the adjusted varnish onto said coil end from radially outside said stator while rotating said preheated stator around a central axis that is oriented horizontally;
      completing application of the varnish before the temperature of the stator drops to about 80 degrees Celsius; and
      hardening said varnish dripped onto said coil end by heating said stator.

2. The method for manufacturing a dynamoelectric stator according to claim 1, further comprising:
   a process for mounting to said stator an annular partitioning plate made of an electrically-insulating resin so as to cover at least a radially-inner peripheral surface of said coil end before said varnish treatment process.

3. The method for manufacturing a dynamoelectric stator according to claim 2, wherein;
   said partitioning plate is shaped with a J-shaped cross section covering a radially-inner peripheral surface and an axially-outer peripheral surface of said coil end.

4. The method for manufacturing a dynamoelectric stator according to claim 1, wherein:
   a rotational speed of said stator in said varnish application process is set so as to be between 5 and 50 rpm.

5. The method for manufacturing a dynamoelectric stator according to claim 1, wherein:
   said stator is rotated around said central axis for a predetermined amount of time at least initially in said varnish heat hardening process.

* * * * *